(12) United States Patent
Huang et al.

(10) Patent No.: US 11,156,864 B2
(45) Date of Patent: Oct. 26, 2021

(54) BACKLIGHT MODULE INCLUDING A FIXING FRAME AND DISPLAY DEVICE COMPRISING THE SAME

(71) Applicants: Radiant(Guangzhou) Opto-Electronics Co., Ltd, Guangdong (CN); Radiant Opto-Electronics Corporation, Kaohsiung (TW)

(72) Inventors: Teng-Yi Huang, Kaohsiung (TW); Yung-Chieh Chao, Kaohsiung (TW)

(73) Assignees: Radiant(Guangzhou) Opto-Electronics Co., Ltd, Guangdong (CN); Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 17/134,184

(22) Filed: Dec. 25, 2020

(65) Prior Publication Data
US 2021/0116633 A1  Apr. 22, 2021

Related U.S. Application Data

(63) Continuation of application No. PCT/CN2019/104553, filed on Sep. 5, 2019.

(51) Int. Cl.
*F21V 8/00*  (2006.01)
*G02F 1/1333*  (2006.01)
*G02F 1/13357*  (2006.01)

(52) U.S. Cl.
CPC ..... *G02F 1/133314* (2021.01); *G02B 6/0088* (2013.01); *G02F 1/1333* (2013.01); *G02F 1/133317* (2021.01); *G02F 1/133608* (2013.01); *G02F 2201/46* (2013.01)

(58) Field of Classification Search
CPC ............ G02B 6/0088; G02F 1/133314; G02F 1/133317; G02F 1/133608
See application file for complete search history.

(56) References Cited

U.S. PATENT DOCUMENTS

| | | | |
|---|---|---|---|
| 7,894,016 B2* | 2/2011 | Hamada | G02B 6/009 349/58 |
| 8,164,704 B2* | 4/2012 | Kim | G02F 1/13454 349/58 |
| 10,241,257 B2* | 3/2019 | Ahn | G02B 6/0026 |
| 2010/0271845 A1 | 10/2010 | Chiu et al. | |
| 2011/0242458 A1* | 10/2011 | Itakura | G02B 6/0073 349/65 |

(Continued)

FOREIGN PATENT DOCUMENTS

| CN | 2852182 Y | 12/2006 |
|---|---|---|
| CN | 101308288 A | 11/2008 |

(Continued)

*Primary Examiner* — Keith G. Delahoussaye
(74) *Attorney, Agent, or Firm* — CKC & Partners Co., LLC

(57) ABSTRACT

A backlight module includes a carrying member, a light source, a light guide plate, a fixing frame and an outer component. The light source is disposed on the carrying member. The light guide plate is disposed on the carrying member, in which a light-incident surface of the light guide plate is disposed adjacent to the light source. The fixing frame fixed on a bottom portion of the carrying member along a first direction. The outer component is fixed on the fixing frame along a second direction.

16 Claims, 15 Drawing Sheets

(56) References Cited

U.S. PATENT DOCUMENTS

| | | | | |
|---|---|---|---|---|
| 2012/0026424 | A1* | 2/2012 | Youk | G02B 6/0083 349/62 |
| 2013/0027965 | A1* | 1/2013 | Noh | G02F 1/133308 362/602 |
| 2014/0139778 | A1* | 5/2014 | Wang | G02F 1/133308 349/58 |
| 2014/0307204 | A1* | 10/2014 | Nakano | G02B 6/0085 349/65 |
| 2015/0098026 | A1* | 4/2015 | Kasai | G02B 6/0085 348/794 |
| 2015/0103285 | A1* | 4/2015 | Li | G02F 1/13452 349/58 |
| 2015/0167952 | A1* | 6/2015 | Lee | G02F 1/133603 362/612 |
| 2015/0212361 | A1* | 7/2015 | Zhao | G02F 1/133308 349/58 |
| 2016/0223739 | A1* | 8/2016 | Yoon | G02B 6/009 |
| 2017/0038515 | A1* | 2/2017 | Yuki | G02B 6/0038 |
| 2017/0192163 | A1* | 7/2017 | Oh | G02B 6/0088 |
| 2017/0261804 | A1* | 9/2017 | Zhao | G02F 1/133308 |
| 2018/0114780 | A1* | 4/2018 | Sung | H01L 33/62 |
| 2020/0050046 | A1* | 2/2020 | Park | G02B 6/0085 |

FOREIGN PATENT DOCUMENTS

| | | |
|---|---|---|
| CN | 203082685 U | 7/2013 |
| CN | 103375776 A | 10/2013 |
| CN | 103574390 A | 2/2014 |
| CN | 103398325 B | 5/2015 |
| CN | 103292213 B | 7/2016 |

* cited by examiner

BACKLIGHT MODULE INCLUDING A FIXING FRAME AND DISPLAY DEVICE COMPRISING THE SAME

RELATED APPLICATIONS

This application is a continuation application of International Application No. PCT/CN2019/104553 filed on Sep. 5, 2019, which is incorporated herein by reference.

BACKGROUND

Field of Invention

The present invention relates to a light source module. More particularly, the present invention relates to a backlight module and a display device using the backlight module.

Description of Related Art

Referring to FIG. 1, FIG. 1 is a schematic structural diagram showing a conventional display device 900. The display device 900 includes a backlight module 910, a display panel 920, a pressing plate 930, a plastic frame 940 and an exterior front frame 950. The backlight module 910 includes a sheet metal 911, a heat dissipating seat 912, a light source 913 and a light guide plate 914. The heat dissipating seat 912 is disposed in the sheet metal 911. The light source 913 and the light guide plate 914 are disposed in the heat dissipating seat 912. The pressing plate 930 is used to press the light guide plate 914 and carry the display panel 920 at the same time. The plastic frame 940 and the exterior front frame 950 are fixed on the sheet metal 911 so as to form a border area of the display device 900, and the border area has a width S1.

In order to fix the pressing plate 930, the plastic frame 940 and the exterior front frame 950 to the backlight module 910, a structure capable of combining the pressing plate 930, the plastic frame 940, and the exterior front frame 950 must be installed on the sheet metal 911, for example, a stud 960 which extends from a side surface of the sheet metal 911, but this design is not conducive to a narrow border design. On the other hand, because the conventional sheet metal 911 covers the entire heat dissipating seat 912, it is likely to cause poor heat dissipation effect of the heat dissipating seat 912.

SUMMARY

The invention provides a backlight module and a display device which can meet a requirement of narrow border.

According to the aforementioned object, a backlight module is provided. The backlight module includes a carrying member, a light source, a light guide plate, a fixing frame and an outer component. The light source is disposed on the carrying member. The light guide plate is disposed on the carrying member, in which a light-incident surface of the light guide plate is disposed adjacent to the light source. The fixing frame fixed on a bottom portion of the carrying member along a first direction. The outer component is fixed on the fixing frame along a second direction.

According to an embodiment of the present invention, the carrying member includes a carrying portion and a sidewall standing on a side edge of the carrying portion. The light source and the light guide plate are disposed on the carrying portion. The fixing frame is non-coplanar with the carrying member in the second direction to form an accommodating space. The fixing frame includes a plate portion and a first engaging wall. The plate portion is abutted against a bottom surface of the carrying portion. The first engaging wall stands on the plate portion, in which the first engaging wall is embedded in the bottom surface of the carrying portion. The backlight module further includes an assembling structure, in which at least one portion of the assembling structure is located in the accommodating space, and the assembling structure fixes the outer component to the fixing frame in the second direction.

According to an embodiment of the present invention, the fixing frame further includes a second engaging wall standing on the plate portion, in which the second engaging wall is embedded in the bottom surface of the carrying portion, and a distance between the second engaging wall and the sidewall is greater than a distance between the first engaging wall and the sidewall.

According to an embodiment of the present invention, the accommodating space is defined by the first engaging wall, the carrying portion and the sidewall. The assembling structure is disposed on the first engaging wall.

According to an embodiment of the present invention, the assembling structure includes a fixing post disposed on an outer side surface of the first engaging wall. The fixing post extends along a direction parallel to the second direction to be fixed with the outer component.

According to an embodiment of the present invention, the assembling structure includes a fixing hole and at least one fixing post. The fixing hole penetrates through an outer side surface of the first engaging wall, and the fixing post is fixed in the fixing hole, in which the fixing post extends from the outer side surface of the first engaging wall along a direction parallel to the second direction to be fixed with the outer component.

According to an embodiment of the present invention, the plate portion has at least a mounting hole, and at least one mounting member can be inserted through the mounting hole along the first direction to fix the plate portion to the bottom surface of the carrying portion.

According to an embodiment of the present invention, the outer component includes a pressing unit. The pressing unit has a pressing portion and a side plate portion. The pressing portion has a pressing surface abutted against a top surface of the sidewall and an optical surface of the light guide plate, and the side plate portion is connected to the pressing portion and is abutted against an outer side surface of the sidewall. The assembling structure further includes a first fixing post and a first fixing member, in which the first fixing post is disposed on the first engaging wall of the fixing frame, and the first fixing member passes through the side plate portion of the pressing unit and is fixed on the first fixing post.

According to an embodiment of the present invention, the first fixing member of the assembling structure has a head portion and a rod portion, and the first fixing post and the rod portion of the first fixing member are located in the accommodating space, and the rod portion passes through the side plate portion of the pressing unit and is fixed in the first fixing post.

According to an embodiment of the present invention, the outer component further includes an exterior member, and the exterior member covers the pressing unit. The assembling structure further includes a second fixing post and a second fixing member, in which the second fixing post is disposed on the first engaging wall of the fixing frame, and the second fixing member passes through the exterior member and the side plate portion of the pressing unit and is fixed on the second fixing post.

According to an embodiment of the present invention, the fixing frame further includes a first L-shaped structure extending from the plate portion, in which the first L-shaped structure has a first contacting surface extending along the first direction. The outer component includes a pressing unit, and the pressing unit has a pressing portion and a side plate portion, in which the pressing portion has a pressing surface abutted against a top surface of the sidewall and an optical surface of the light guide plate, and the side plate portion is connected to the pressing portion and is abutted against the outer side surface of the sidewall. The assembling structure further includes a first assembling member passing through the side plate portion of the pressing unit and is fixed on the first contacting surface of the first L-shaped structure.

According to an embodiment of the present invention, the first assembling member of the assembling structure has a head portion and a rod portion, in which the first contacting surface of the first L-shaped structure and the rod portion of the first assembling member are located in the accommodating space, and the rod portion passes through the side plate portion of the pressing unit and is fixed on the first L-shaped structure.

According to an embodiment of the present invention, the fixing frame further includes a second L-shaped structure extending from the plate portion, in which the second L-shaped structure has a second contacting surface extending along the first direction, and a distance between the second contacting surface and the first engaging wall is greater than a distance between the first contacting surface and the first engaging wall. The outer component includes exterior member covering the pressing unit. The assembling structure further includes a second assembling member passing through the exterior member and the side plate portion of the pressing unit, in which the second assembling member is fixed on the second contacting surface of the second L-shaped structure.

According to the aforementioned object, a display device is provided. The display device includes the aforementioned backlight module and a display panel. The display panel is disposed in front of the backlight module.

According to the aforementioned embodiments of the present disclosure, the fixing frame of the present disclosure is disposed under the carrying member along the first direction, and the accommodating space can be formed by the non-coplanar design of the fixing frame and the carrying member in the second direction. Therefore, the assembling structure which is used to fix the outer component can be accommodated in the accommodating space, thereby reducing the border width of the display panel, so as to meet a requirement of narrow border. On the other hand, by the design of the stripe fixing frame which does not completely cover the carrying member, the heat dissipation effect of the carrying member can be improved.

BRIEF DESCRIPTION OF THE DRAWINGS

The invention can be more fully understood by reading the following detailed description of the embodiment, with reference made to the accompanying drawings as follows.

DETAILED DESCRIPTION

Directional terms, such as "X-direction", "Z-direction" and the like, may be used herein for ease of description to describe one element or feature's relationship to another element(s) or feature(s) as illustrated in the figures. The directional terms are intended to encompass different orientations of the device in use or operation in addition to the orientation depicted in the figures.

Figure 2:
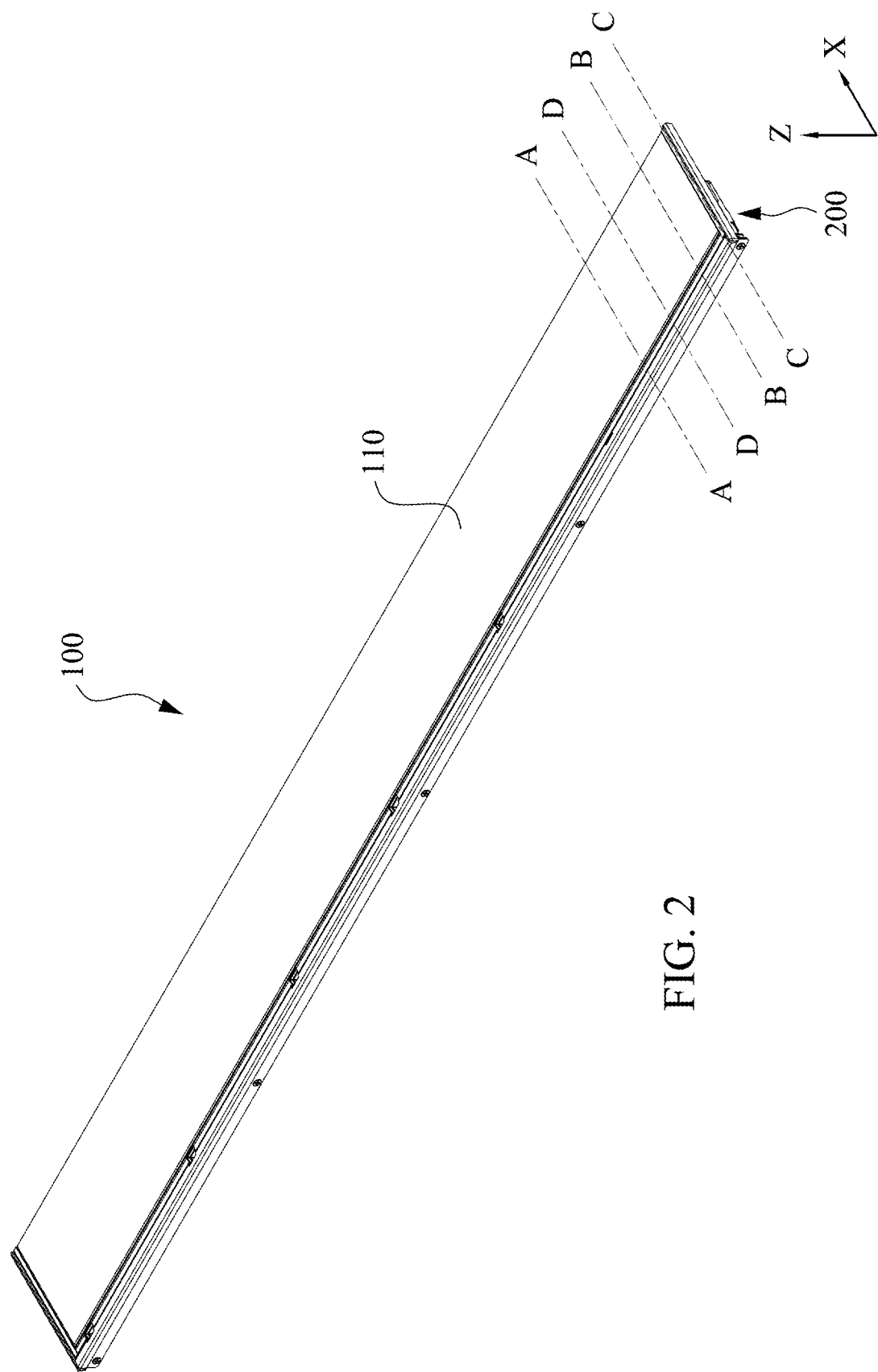
FIG. 2 is a schematic structural diagram showing a display device in accordance with a first embodiment of the present invention.
Figure 3:
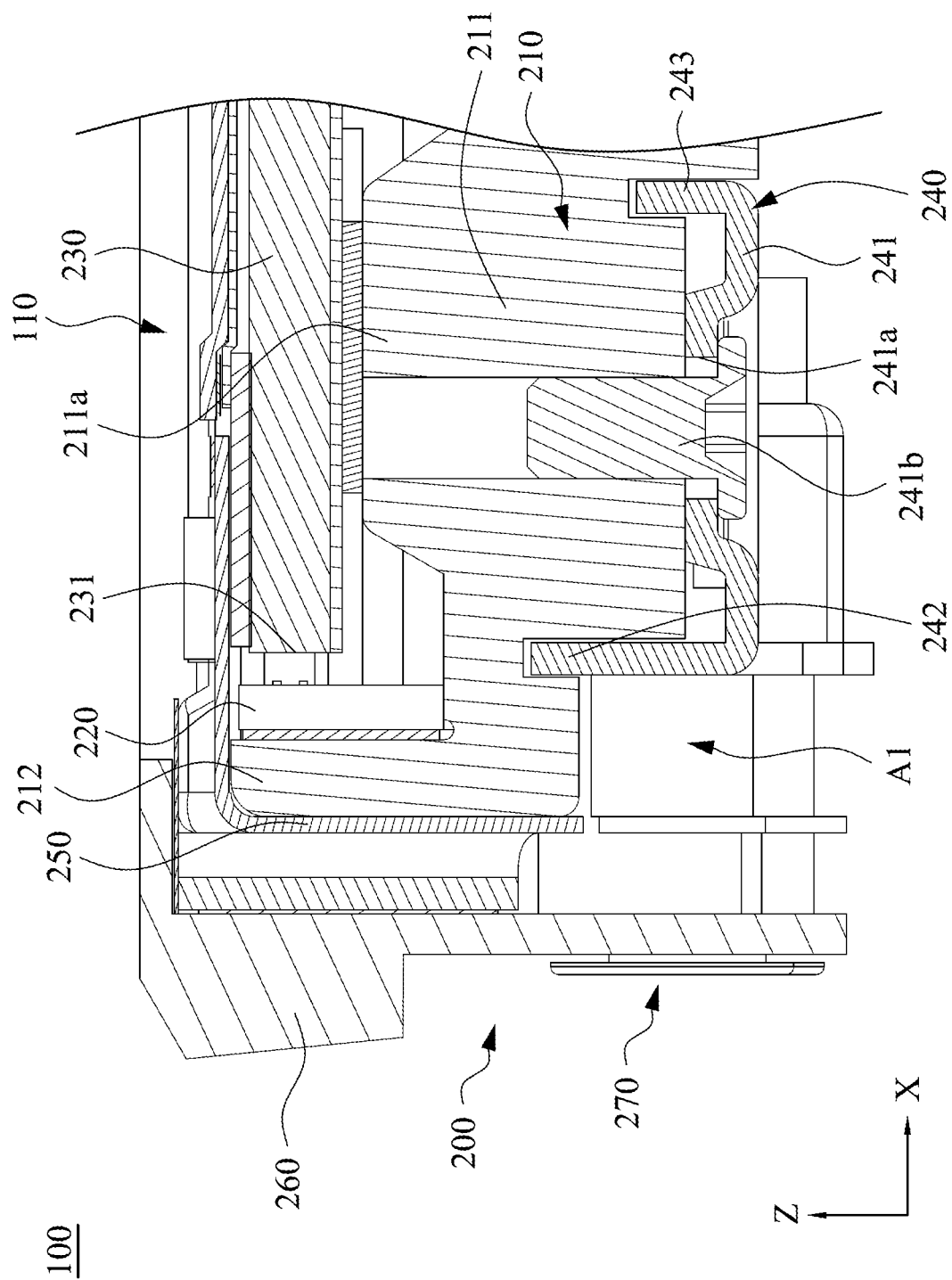
FIG. 3 is a schematic cross-sectional view taken along a line A-A in FIG. 2.

Simultaneously referring to FIG. 2 and FIG. 3, FIG. 2 is a schematic structural diagram showing a display device 100 in accordance with a first embodiment of the present invention, and FIG. 3 is a schematic cross-sectional view taken along a line A-A in FIG. 2. It is noted that, the actual cutting position of the A-A section line in FIG. 2 is substantially the same as the cutting position of the A-A section line in FIG. 5. The display device 100 of the present embodiment mainly includes a backlight module 200 and a display panel 110, and the display panel 110 is disposed in front of the backlight module 200. The backlight module 200 mainly includes a carrying member 210, a light source 220, a light guide plate 230, a fixing frame 240, an outer component (for example, a pressing unit 250 and/or an exterior member 260), and an assembling structure 270. The carrying member 210 is used to carry and support the light source 220 and the light guide plate 230. The fixing frame 240 is a stripe structure and is disposed on a bottom portion of the carrying member 210 which is near a side of the light source 220 (that is, a bottom side of the display device 100). The fixing frame 240 is used to be fixed with the assembling structure 270 for securing the outer component on the carrying member 210.

Figure 4:
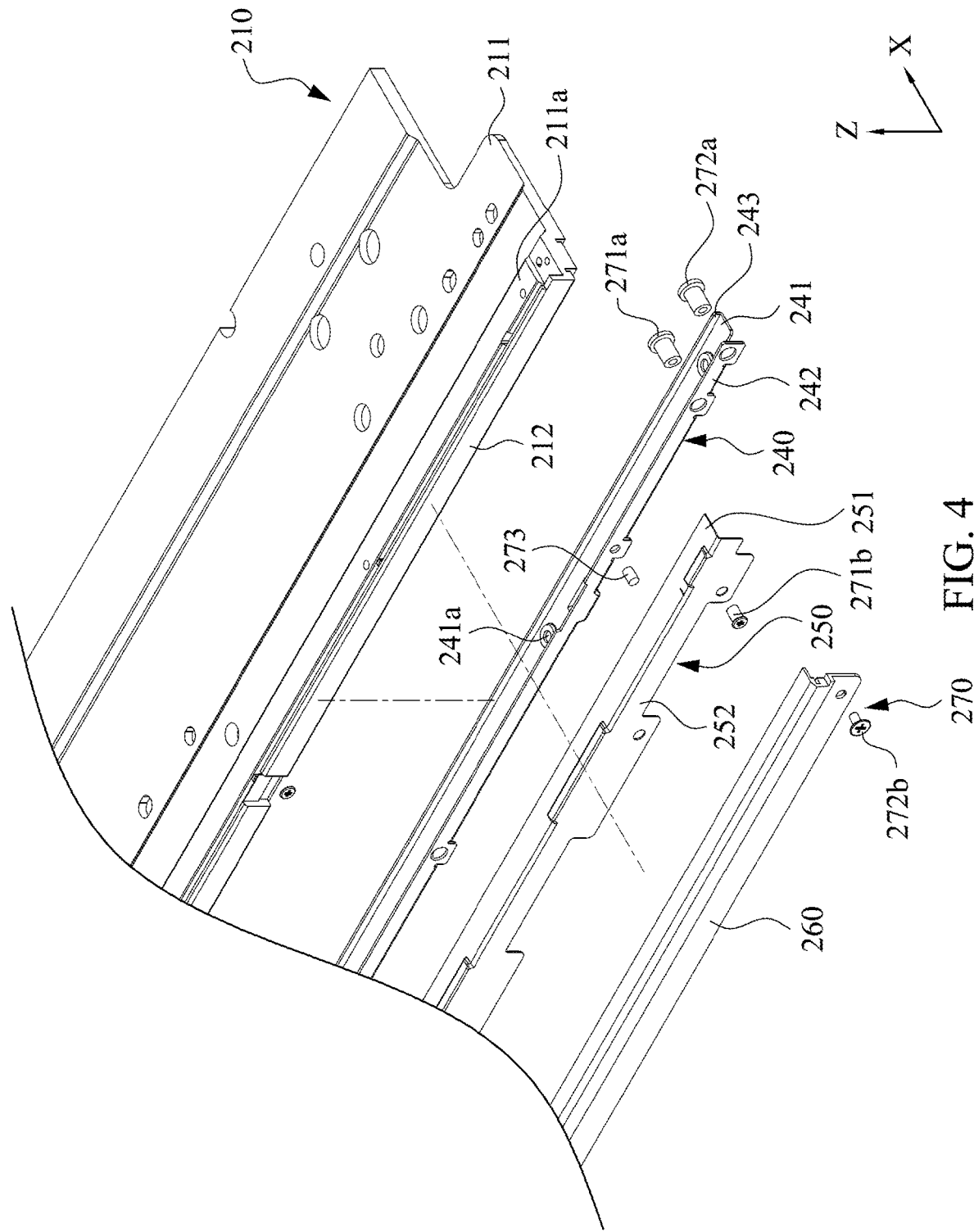
FIG. 4 is a partial exploded view of some elements in accordance with the first embodiment of the present invention.

Referring to FIG. 3 and FIG. 4, FIG. 4 is a partial exploded view of some elements in accordance with the first embodiment of the present invention. It is noted that, in order to clearly describe details of the elements, FIG. 4 only shows parts of the carrying member 210, the fixing frame 240, the pressing unit 250 and the exterior member 260. The carrying member 210 has generally L-shaped when viewed from the side, and the carrying member 210 includes a carrying portion 211 and a sidewall 212 standing on a side edge of the carrying portion 211. The light guide plate 230 is carried on the carrying portion 211. The light source 220 is attached on the sidewall 212 and is disposed adjacent to a light-incident surface 231 of the light guide plate 230. In the present embodiment, a protruding structure 211a can be formed on a portion of the carrying portion 211 which is near the sidewall 212. In addition to supporting the light guide plate 230, the protruding structure 211a also has a function of enhancing the overall structural strength of the carrying member 210. In some embodiments, the carrying member 210 can be a heat sink, so that heat generated from the light source 220 can be dissipated to the surroundings through the carrying member 210.

Figure 5:
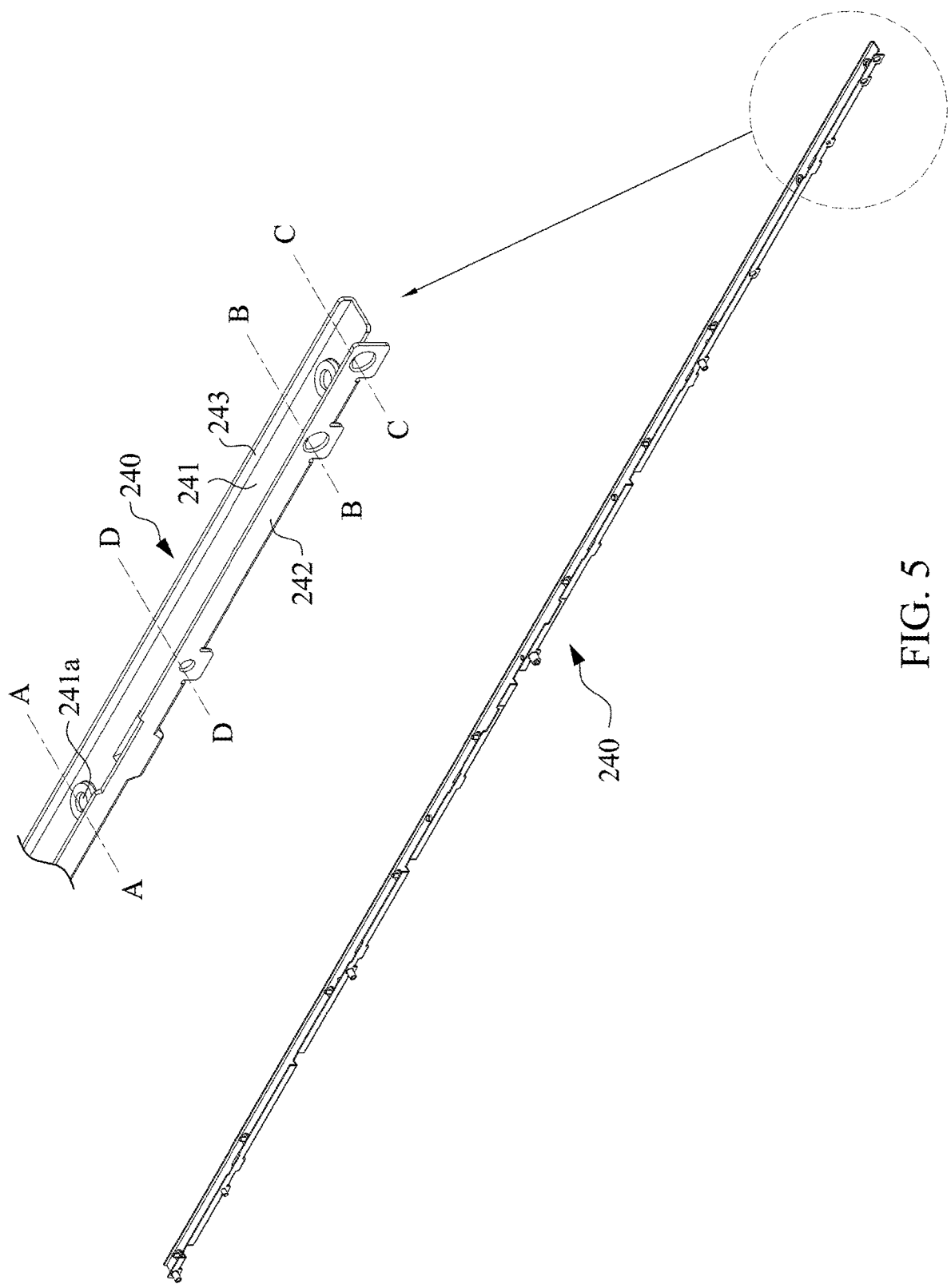
FIG. 5 is a schematic structural diagram showing a fixing frame in accordance with the first embodiment of the present invention.

Referring to FIG. 3 and FIG. 4, the fixing frame 240 is fixed to the bottom portion of the carrying member 210 along a first direction (such as Z-direction shown in FIG. 3 and FIG. 4). Simultaneously referring to FIG. 5, FIG. 5 is a schematic structural diagram showing the fixing frame 240 in accordance with the first embodiment of the present invention. In the present embodiment, the fixing frame 240 includes a plate portion 241, a first engaging wall 242, and a second engaging wall 243. The first engaging wall 242 and the second engaging wall 243 respectively stands on two opposite sides of the plate portion 241, such that the fixing frame 240 has a generally U-shaped when viewed from the side. As shown in FIG. 3, the plate portion 241 abuts against the bottom surface of the carrying portion 211, and the first engaging wall 242 and the second engaging wall 243 are embedded in the carrying portion 211. In this way, the stability of the combination between the fixing frame 240 and the carrying member 210 can be increased. In some examples, the plate portion 241 has at least one mounting hole 241a, and the mounting hole 241a is provided for at least one mounting member 241b to pass through along the first direction (for example, Z-direction), so as to fix the plate portion 241 to the bottom surface of the carrying portion 211.

As shown in FIG. 3 and FIG. 4, a distance between the first engaging wall 242 and the sidewall 212 of the carrying member 210 is smaller than a distance between the second engaging wall 243 and the sidewall 212 of the carrying member 210. In other words, the first engaging wall 242 is closer to sidewall 212 than the second engaging wall 243. In one example, the sidewall 212 of the carrying member 210 and the first engaging wall 242 (or the second engaging wall 243) are parallel to each other. In the present embodiment, an accommodating space A1 is formed by using an avoidance design in which the fixing frame 240 is non-coplanar with the carrying member 210 in a second direction (for example, X-direction as shown in FIG. 3). More specifically, the fixing frame 240 is disposed under the carrying member 210, and the sidewall 212 of the fixing frame 240 is not aligned with the first engaging wall 242, such that the first engaging wall 242, the sidewall 212 and the carrying portion 211 of the carrying member 210 collectively form the accommodating space A1. The accommodating space A1 is used to accommodate a portion of the assembling structure 270 which is used for fixing the outer component (such as the pressing unit 250 and/or the exterior member 260).

Figure 6:
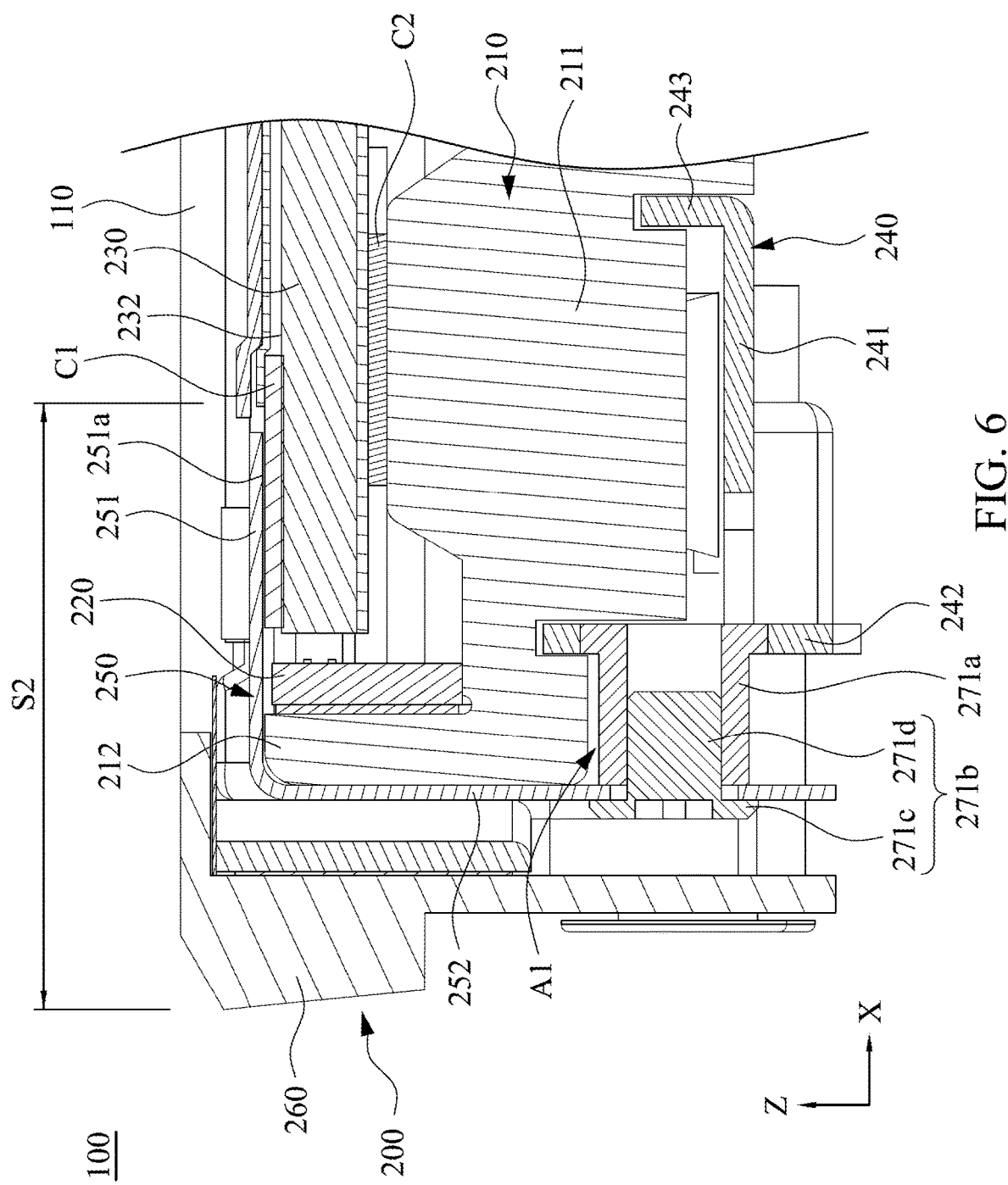
FIG. 6 is a schematic cross-sectional view taken along a line B-B in FIG. 2.

Simultaneously referring to FIG. 4 and FIG. 6, FIG. 6 is a schematic cross-sectional view taken along a line B-B in FIG. 2. It is noted that, the actual cutting position of the B-B section line in FIG. 2 is substantially the same as the cutting position of the B-B section line in FIG. 5. In the present embodiment, the pressing unit 250 is combined with the fixing frame 240 in the second direction (for example, X-direction as shown in FIG. 4 and FIG. 6). As shown in FIG. 4 and FIG. 6, the pressing unit 250 is an L-shaped structure and has a pressing portion 251 and a side plate portion 252 which is connected to the pressing portion 251. The pressing portion 251 has a pressing surface 251a which abuts against a top surface of the sidewall 212 of the carrying member 210 as well as an optical surface 232 of the light guide plate 230. The side plate portion 252 abuts against an outer side surface of the sidewall 212. In the present embodiment, buffers (such as a buffer C1 and a buffer C2 shown in FIG. 6) can be respectively disposed on a side of the light guide plate 230 which faces the pressing portion 251 and a side of the light guide plate 230 which is supported by the carrying member 210, thereby preventing the light guide plate 230 from being ruptured due to an external impact.

In the present embodiment, the assembling structure 270 includes a first fixing post 271a and a first fixing member 271b. The first fixing post 271a and the first fixing member 271b are used to fix the pressing unit 250 to the fixing frame 240. More specifically, as shown in FIG. 6, one end of the first fixing post 271a is fixed in the first engaging wall 242 of the fixing frame 240, and the other end of the first fixing post 271a extends from the outer surface of the first engaging wall 242 in the second direction (for example, −X-direction as shown in FIG. 6) to the accommodating space A1. The first fixing member 271b passes through the side plate portion 252 of the pressing unit 250 and is fixed to the first fixing post 271a. The first fixing member 271b has a head portion 271c and a rod portion 271d. The head portion 271c abuts against an outer surface of the side plate portion 252 of the pressing unit 250, and the rod portion 271d passes through the side plate portion 252 and is fixed in the first fixing post 271a. Through the design of the first fixing member 271b, the pressing unit 250 can be positioned by the first fixing member 271b in the X direction, thereby preventing the pressing unit 250 from losing its pressing function due to the displacement.

Figure 7:
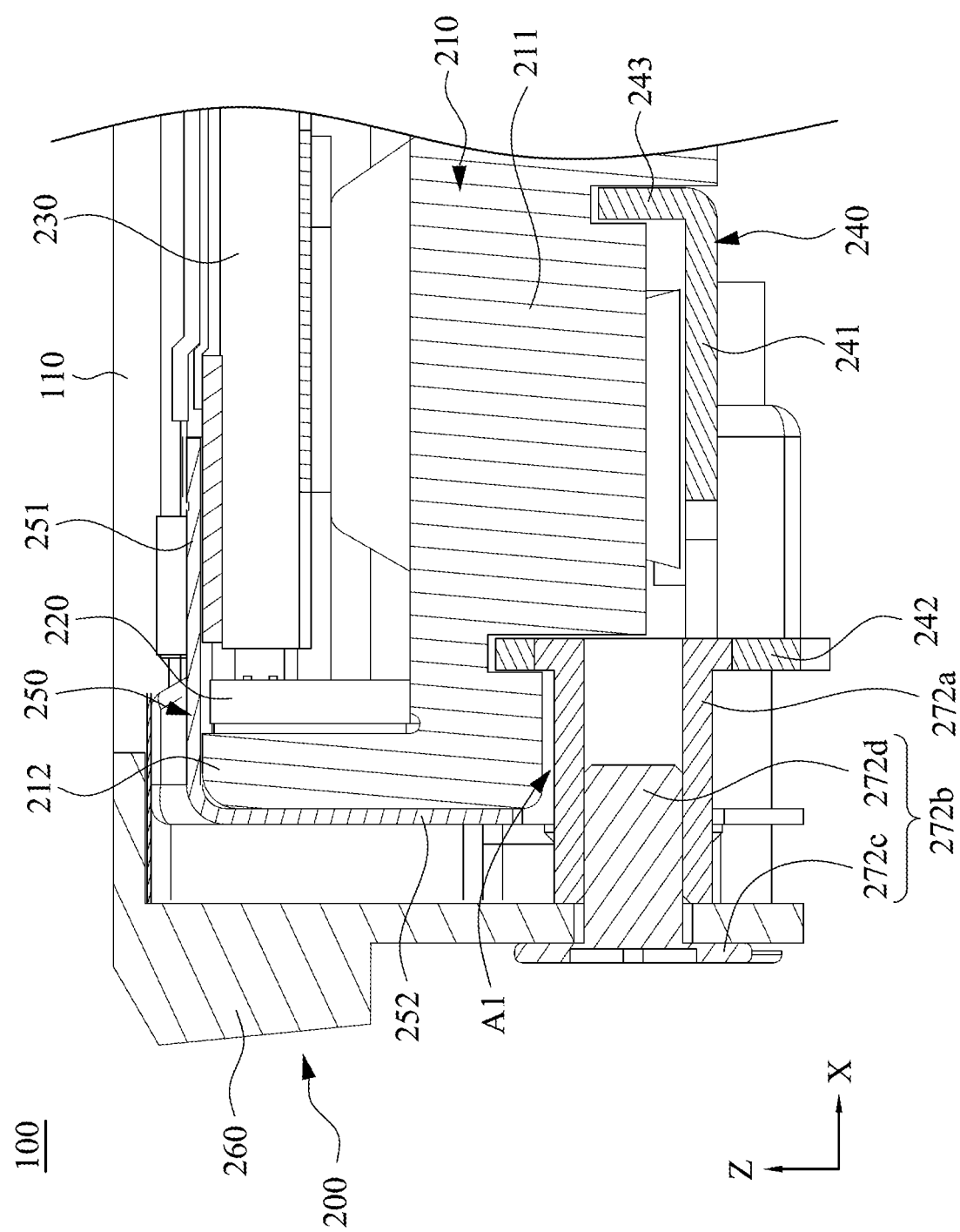
FIG. 7 is a schematic cross-sectional view taken along a line C-C in FIG. 2.

Simultaneously referring to FIG. 4 and FIG. 7, FIG. 7 is a schematic cross-sectional view taken along a line C-C in FIG. 2. It is noted that, the actual cutting position of the C-C section line in FIG. 2 is substantially the same as the cutting position of the C-C section line in FIG. 5. In the present embodiment, the exterior member 260 is combined to the fixing frame 240 along the second direction (for example, X-direction as shown in FIG. 4 and FIG. 7). As shown in FIG. 4 and FIG. 7, the exterior member 260 covers the outside of the pressing unit 250. In the present embodiment, the assembling structure 270 further includes a second fixing post 272a and a second fixing member 272b. The second fixing post 272a and the second fixing member 272b are used to fix the exterior member 260 to the fixing frame 240. More specifically, as shown in FIG. 7, one end of the second fixing post 272a is fixed in the first engaging wall 242 of the fixing frame 240, and the other end of the second fixing post 272a extends from the outer surface of the first engaging wall 242 along the second direction (for example, −X-direction as shown in FIG. 7) to the accommodating space A1. The second fixing member 272b passes through the exterior member 260 as well as the side plate portion 252 of the pressing unit 250 and is fixed in the second fixing post 272a. The second fixing member 272b also has a head portion 272c and a rod portion 272d. The head portion 272c abuts against an outer surface of the exterior member 260, and the rod portion 272d passes through the exterior member 260 as well as the side plate portion 252 of the pressing unit 250 and is fixed in the second fixing post 272a. Through the design of the second fixing member 272b, the exterior member 260 and the pressing unit 250 can be positioned by the second fixing member 272b at the same time. When a user looks at the display device 100 in the −Z direction, the head portion 272c of the second fixing member 272b is covered or sheltered by a protruding portion of the exterior member 260, so as to hide the fixing location of the second fixing post 272.

Figure 8:
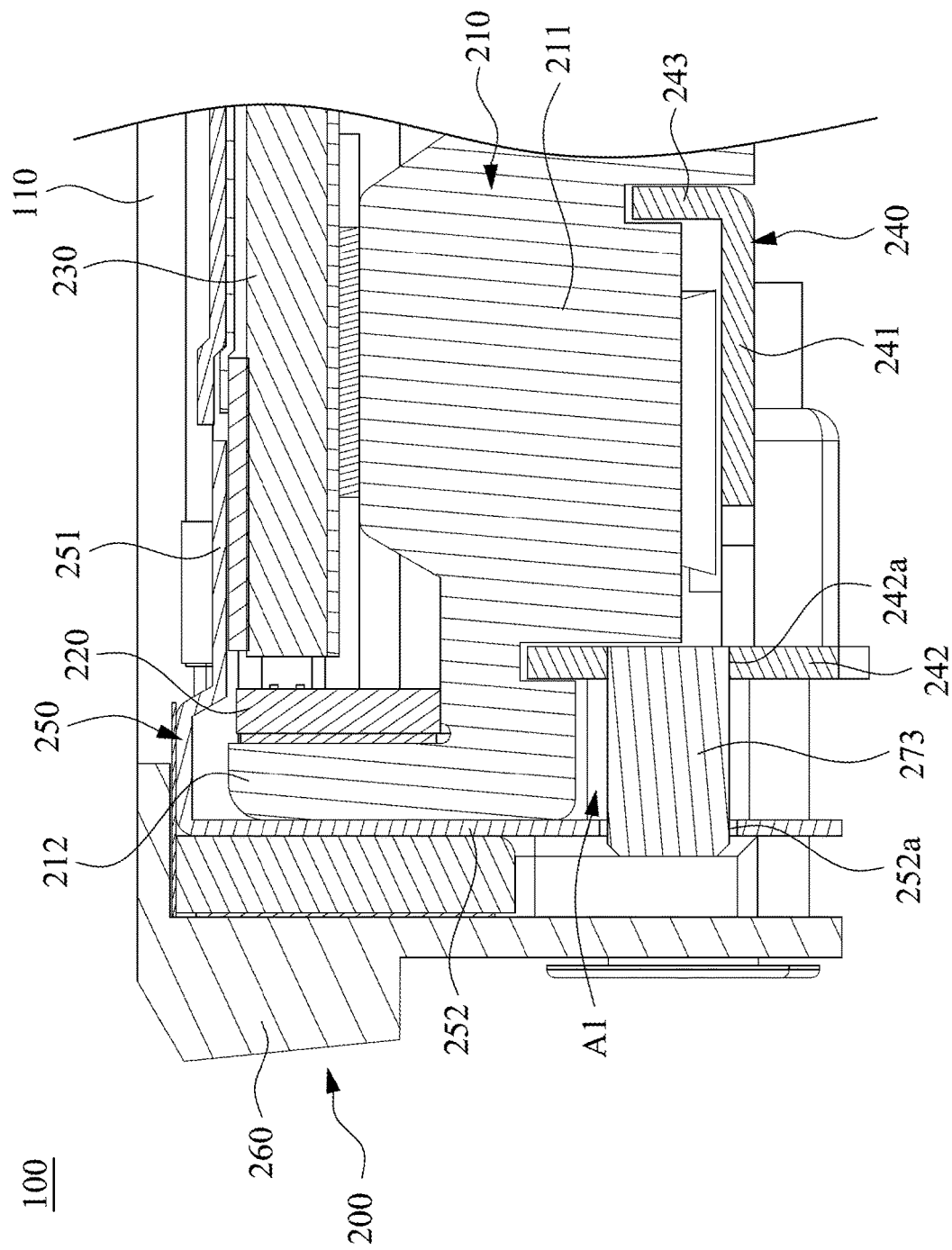
FIG. 8 is a schematic cross-sectional view taken along a line D-D in FIG. 2.

Simultaneously referring to FIG. 4 and FIG. 8, FIG. 8 is a schematic cross-sectional view taken along a line D-D in FIG. 2. It is noted that, the actual cutting position of the D-D section line in FIG. 2 is substantially the same as the cutting position of the D-D section line in FIG. 5. The assembling structure 270 further includes a fixing post 273. The fixing post 273 is disposed in the accommodating space A1 and can be embedded in the fixing hole 242a of the first engaging wall 242. The fixing post 273 extends along a direction of the second direction (for example, −X-direction as shown in FIG. 8) from the first engaging wall 242. In the present embodiment, the side plate portion 252 of the pressing unit 250 has a through hole 252a. When the pressing unit 250 is combined to the fixing frame 240 along the second direction (for example, X-direction as shown in FIG. 8), a portion of the fixing post 273 is located in the through hole 252a so as to position the pressing unit 250.

Figure 1:
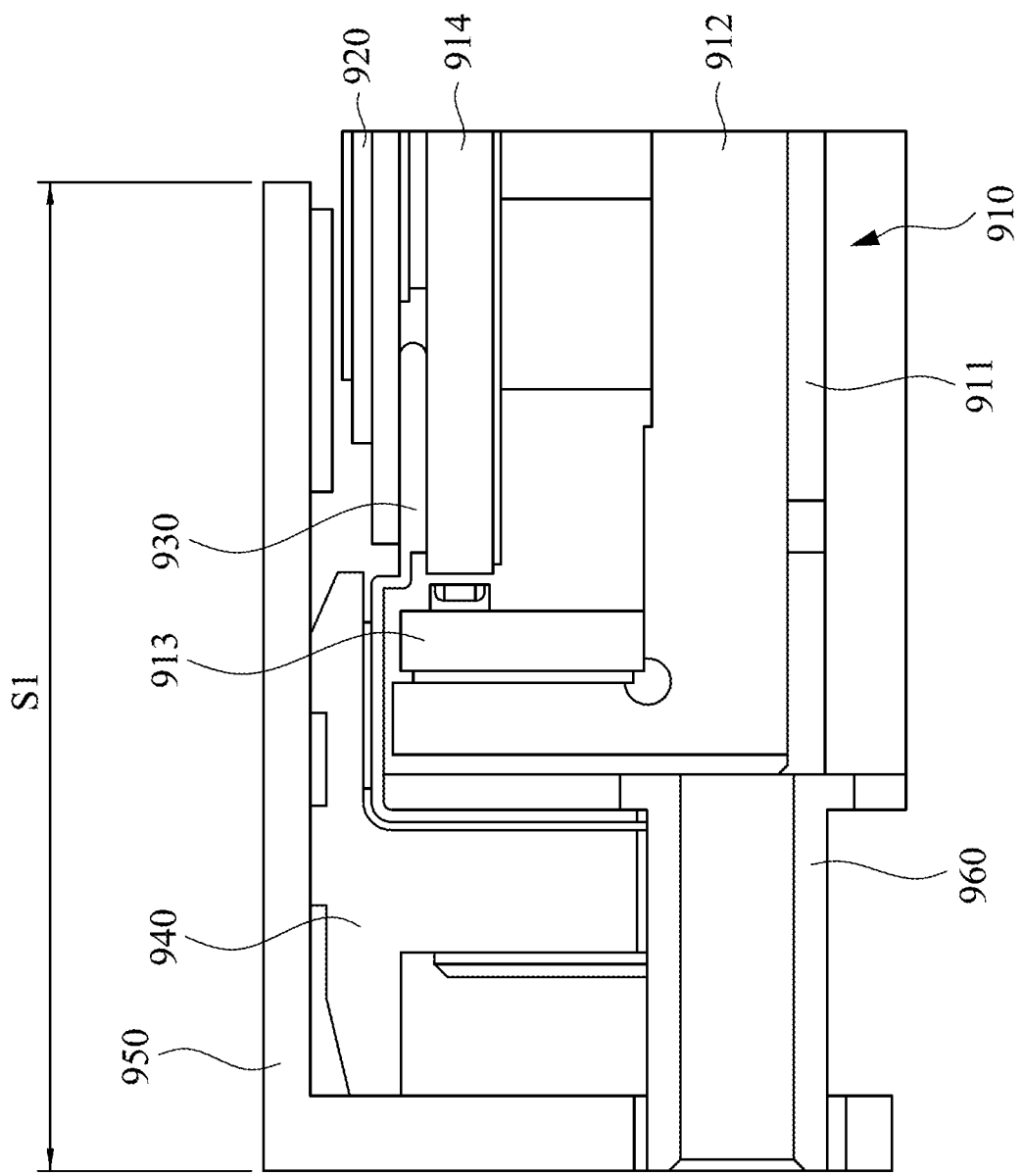
FIG. 1 is a schematic structural diagram showing a conventional display device.

According to the aforementioned embodiments of the present disclosure, the present embodiment cancels the use of the sheet metal 911 as shown in FIG. 1. Instead, the stripe fixing frame 240 is designed to be fixed on one side of the bottom portion of the carrying member 210, thereby meeting an installation requirement of different types of outer components. In addition, the assembling structures 270 with different lengths can be fixed to the first engaging wall 242 so as to fix the outer component on the fixing frame 240 having a strong structural strength. Moreover, the accommodating space A1 is formed by the non-coplanar design of the fixing frame 240 and the carrying member 210 to accommodate the assembling structure 270, thereby reducing the border width of the display panel 100 (for example, a width S2 shown in FIG. 6), so as to meet a requirement of narrow border. On the other hand, by the design of the stripe fixing frame 240 which is not completely cover the carrying member 210, the carrying member 210 can be exposed, thereby improving the heat dissipation effect of the carrying member 210.

Figure 9:
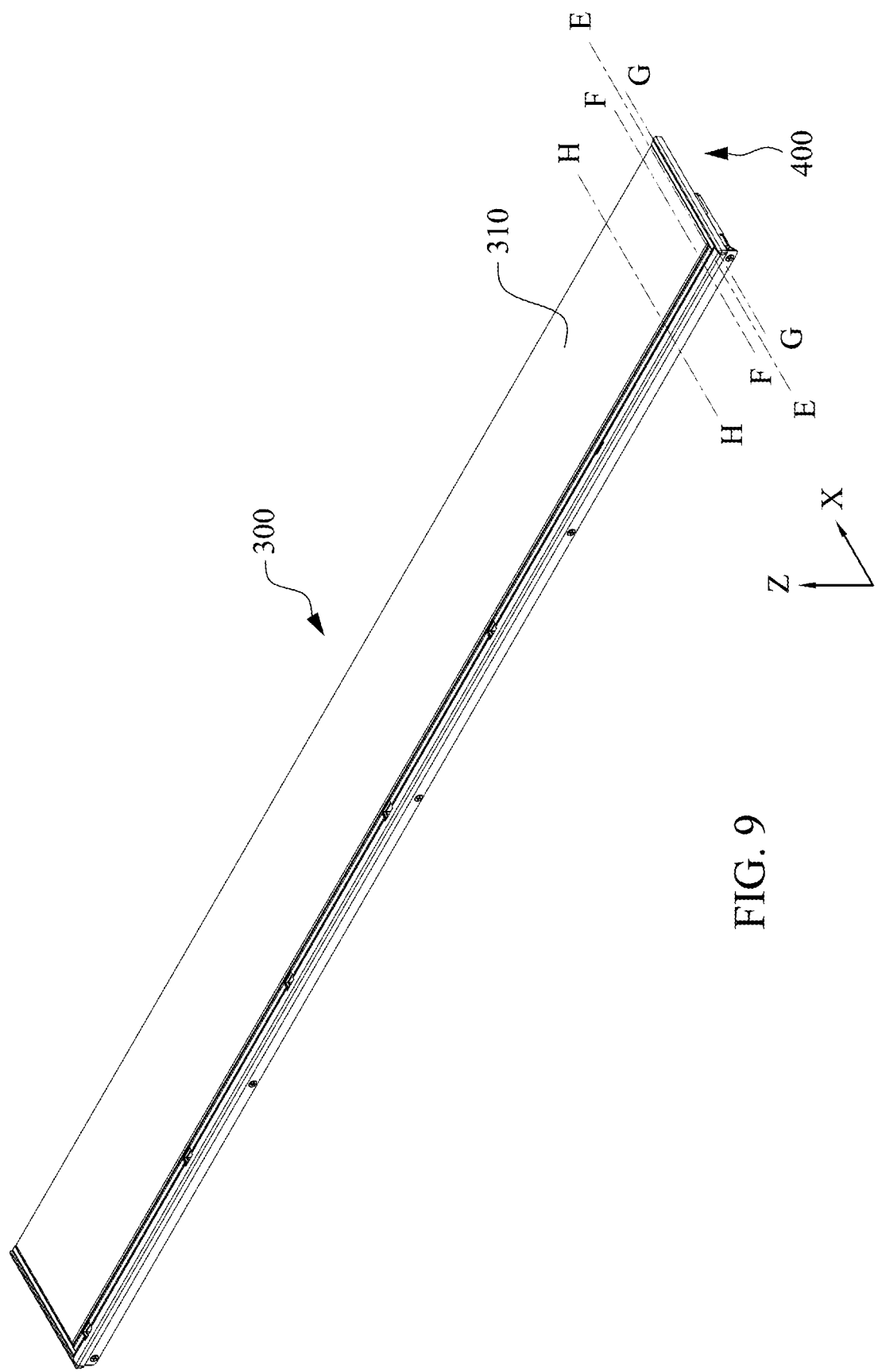
FIG. 9 is a schematic structural diagram showing a display device in accordance with a second embodiment of the present invention.
Figure 10:
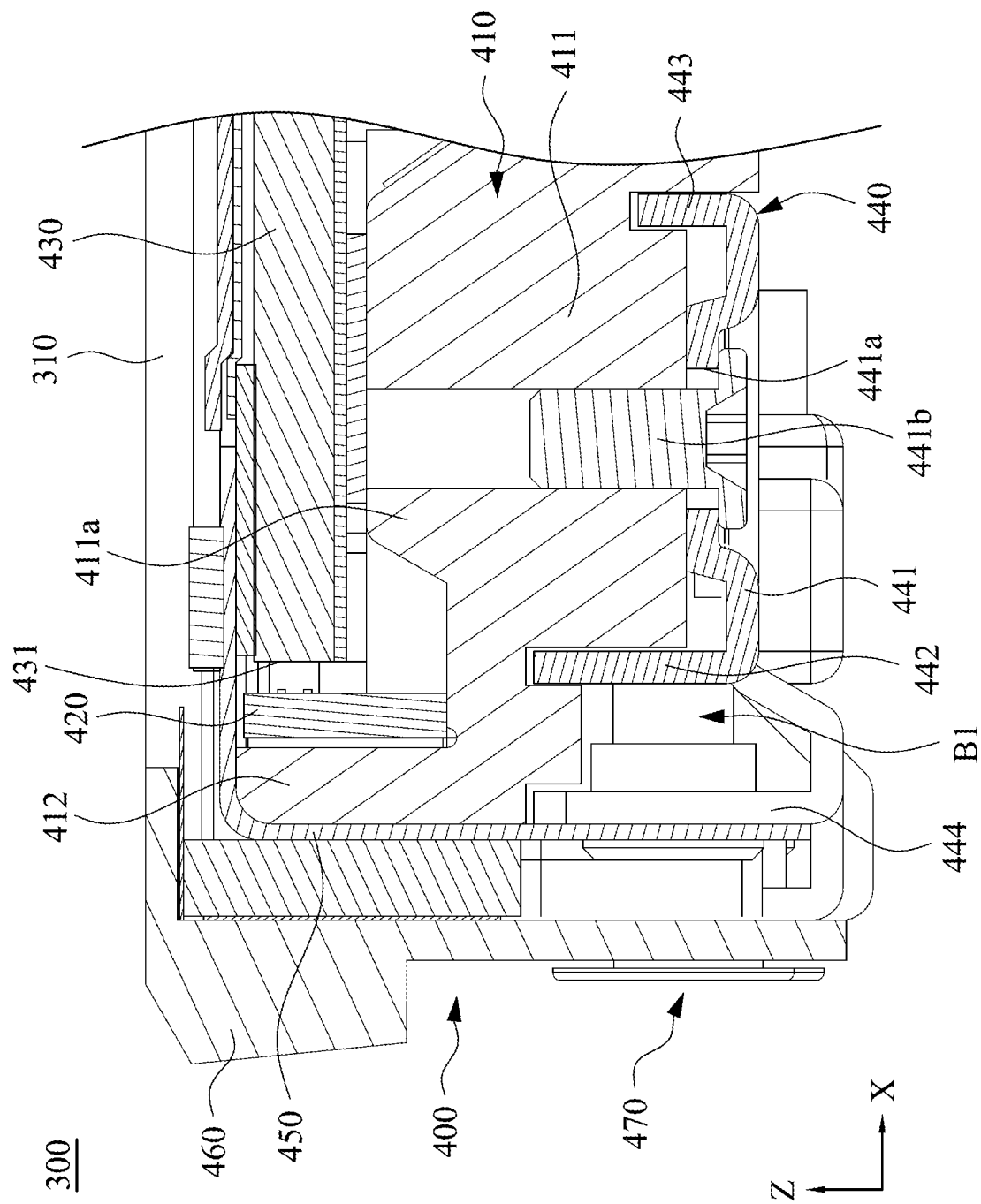
FIG. 10 is a schematic cross-sectional view taken along a line E-E in FIG. 9.

In the present disclosure, the assembling structure has different structural designs. Simultaneously referring to FIG. 9 and FIG. 10, FIG. 9 is a schematic structural diagram showing a display device 300 in accordance with a second embodiment of the present invention, and FIG. 10 is a schematic cross-sectional view taken along a line E-E in FIG. 9. It is noted that, the actual cutting position of the E-E section line in FIG. 9 is substantially the same as the cutting position of the E-E section line in FIG. 12. The display device 300 includes a backlight module 400 and a display panel 310. The display panel 310 is disposed in front of the backlight module 400. The backlight module 400 includes a carrying member 410, a light source 420, a light guide plate 430, a fixing frame 440, an outer component (such as a pressing unit 450 and/or an exterior member 460), and an assembling structure 470. The carrying member 410 is used to carry and support the light source 420 and the light guide plate 430. The fixing frame 440 is a stripe structure and is disposed on a bottom portion of the carrying member 410 which is near a side of the light source 420 (for example, a bottom side of the display device 300). The fixing frame 440 is used to be fixed with the assembling structure 470 for securing the outer component on the carrying member 410.

Figure 11:
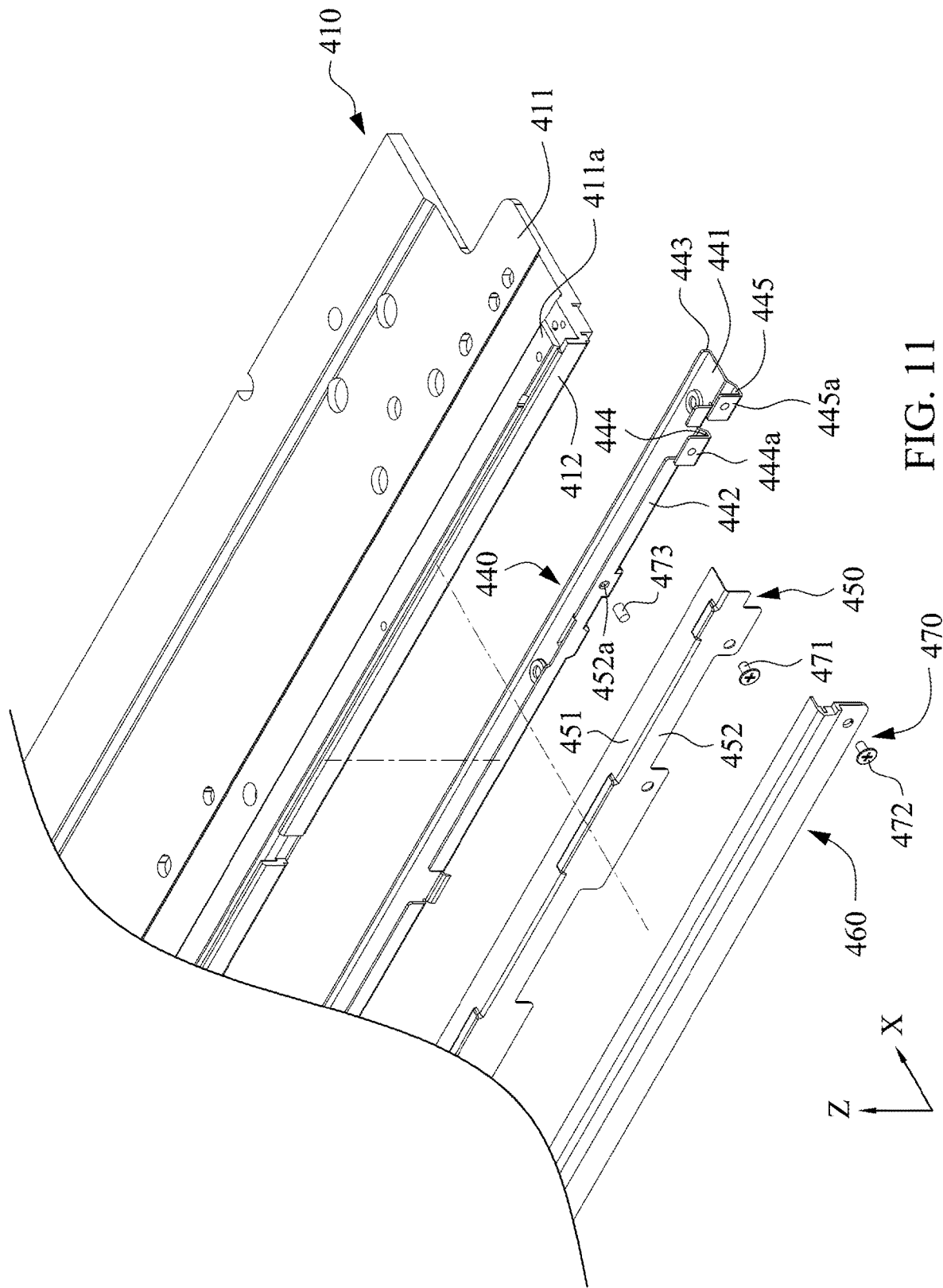
FIG. 11 is a partial exploded view of some elements in accordance with the second embodiment of the present invention.

Simultaneously referring to FIG. 10 and FIG. 11, FIG. 11 is a partial exploded view of some elements in accordance with the second embodiment of the present invention. It is noted that, in order to clearly describe details of the elements, FIG. 11 only shows parts of the carrying member 410, the fixing frame 440, the pressing unit 450 and the exterior member 460. The carrying member 410 has a generally L-shaped when viewed from the side, and the carrying member 410 includes a carrying portion 411 and a sidewall 412 standing on a side edge of the carrying portion 411. The light guide plate 430 is carried on the carrying portion 411. The light source 420 is attached on the sidewall 412 and is disposed adjacent to a light-incident surface 431 of the light guide plate 430. In the present embodiment, a protruding structure 411a can be formed on a portion of the carrying portion 411 near the sidewall 412. In addition to supporting the light guide plate 430, the protruding structure 411a also has a function of increasing the overall structural strength of the carrying member 410. In some embodiments, the carrying member 410 can be a heat sink, so that heat generated from the light source 420 can be dissipated to the surroundings through the carrying member 410.

Figure 12:
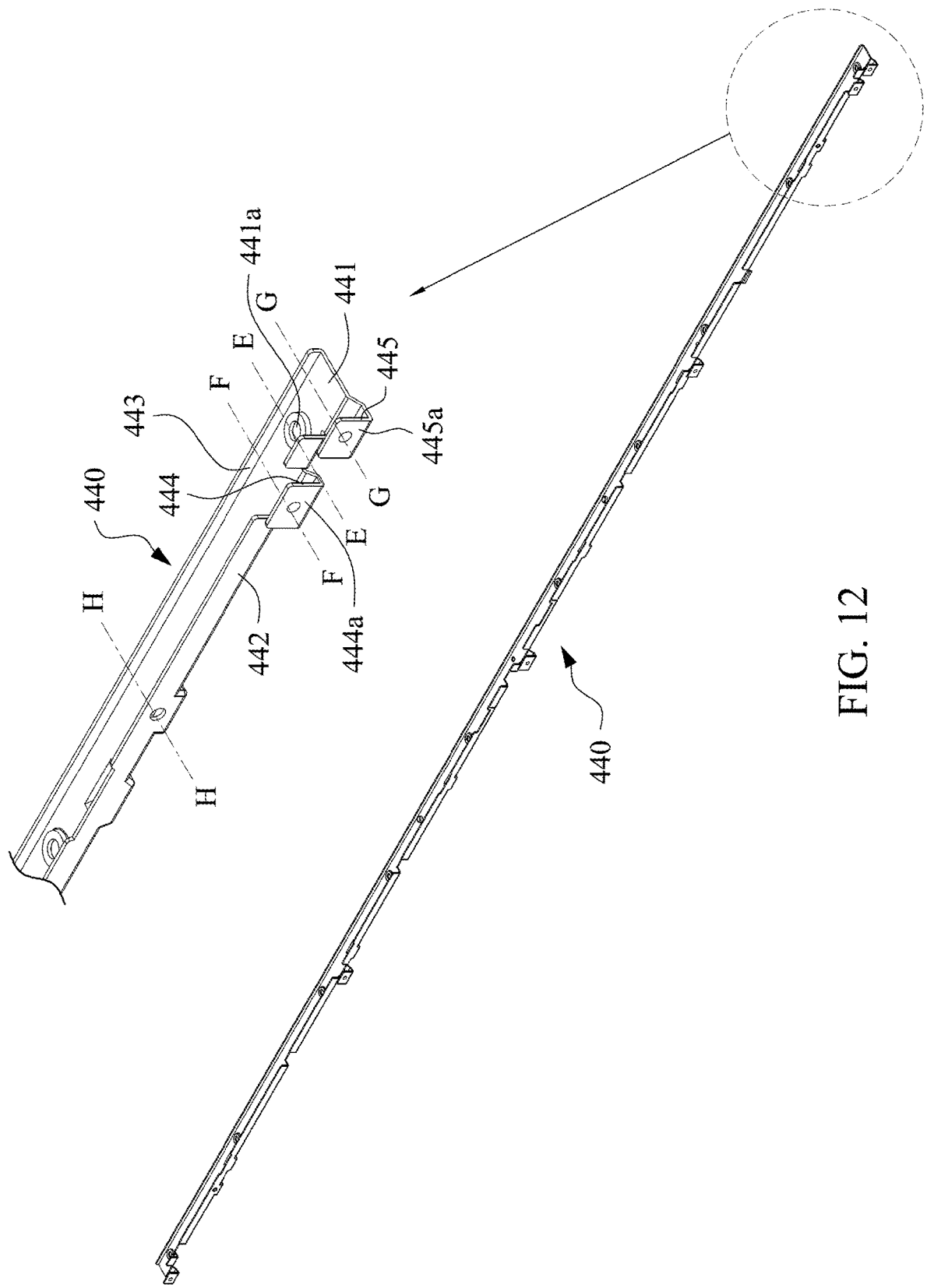
FIG. 12 is a schematic structural diagram showing an fixing frame in accordance with the second embodiment of the present invention.

Referring to FIG. 10 and FIG. 11, the fixing frame 440 is fixed to the bottom portion of the carrying member 410 along a first direction (such as Z-direction shown in FIG. 10 and FIG. 11). Simultaneously referring to FIG. 12, FIG. 12 is a schematic structural diagram showing the fixing frame 440 in accordance with the second embodiment of the present invention. The fixing frame 440 includes a plate portion 441, a first engaging wall 442, and a second engaging wall 443. The first engaging wall 442 and the second engaging wall 443 respectively stands on two opposite sides of the plate portion 441, such that the fixing frame 440 has a generally U-shaped when viewed from the side. As shown in FIG. 10, the plate portion 441 abuts against the bottom surface of the carrying portion 411, and the first engaging wall 442 and the second engaging wall 443 are embedded into the carrying portion 411. In some examples, the plate portion 441 has at least one mounting hole 441a, and the mounting hole 441a is provided for at least one mounting member 441b to pass through along the first direction (for example, Z-direction) so as to fix the plate portion 441 to the bottom surface of the carrying portion 411.

As shown in FIG. 10 and FIG. 11, a distance between the first engaging wall 442 and the sidewall 412 of the carrying member 410 is smaller than a distance between the second engaging wall 443 and the sidewall 412 of the carrying member 410. In other words, the first engaging wall 442 is closer to sidewall 412 than the second engaging wall 443. In one example, the sidewall 412 of the carrying member 410 and the first engaging wall 442 (or the second engaging wall 443) are parallel to each other. In the present embodiment, an accommodating space B1 is formed by using an avoidance design in which the fixing frame 440 is non-coplanar with the carrying member 410 in a second direction (for example, X-direction as shown in FIG. 10). More specifically, the first engaging wall 442, the sidewall 412 and the carrying portion 411 of the carrying member 210 collectively form the accommodating space B1. The accommodating space B1 is mainly used to accommodate a portion of the assembling structure 470 which is used for fixing the outer component (such as the pressing unit 450 and/or the exterior member 460).

As shown in FIG. 11 and FIG. 12, the fixing frame 440 includes a first L-shaped structure 444 and a second L-shaped structure 445. The first L-shaped structure 444 and the second L-shaped structure 445 respectively extend from a side of the plate portion 441 at which the first engaging wall 442 is disposed to the accommodating space B1. In the present embodiment, the first L-shaped structure 444 has a first contacting surface 444a extending along the first direction (for example, Z-direction), and the second L-shaped structure 445 has a second contacting surface 445a extending along the first direction (for example, Z-direction). A distance between the second contacting surface 445a and the first engaging wall 442 is greater than a distance between the first contacting surface 444a and the first engaging wall 442. In addition, the first L-shaped structure 444 is used to provide the pressing unit 450 to be fixed thereon, the L-shaped structure 445 is used to provide the exterior member 460 to be fixed thereon.

Figure 13:
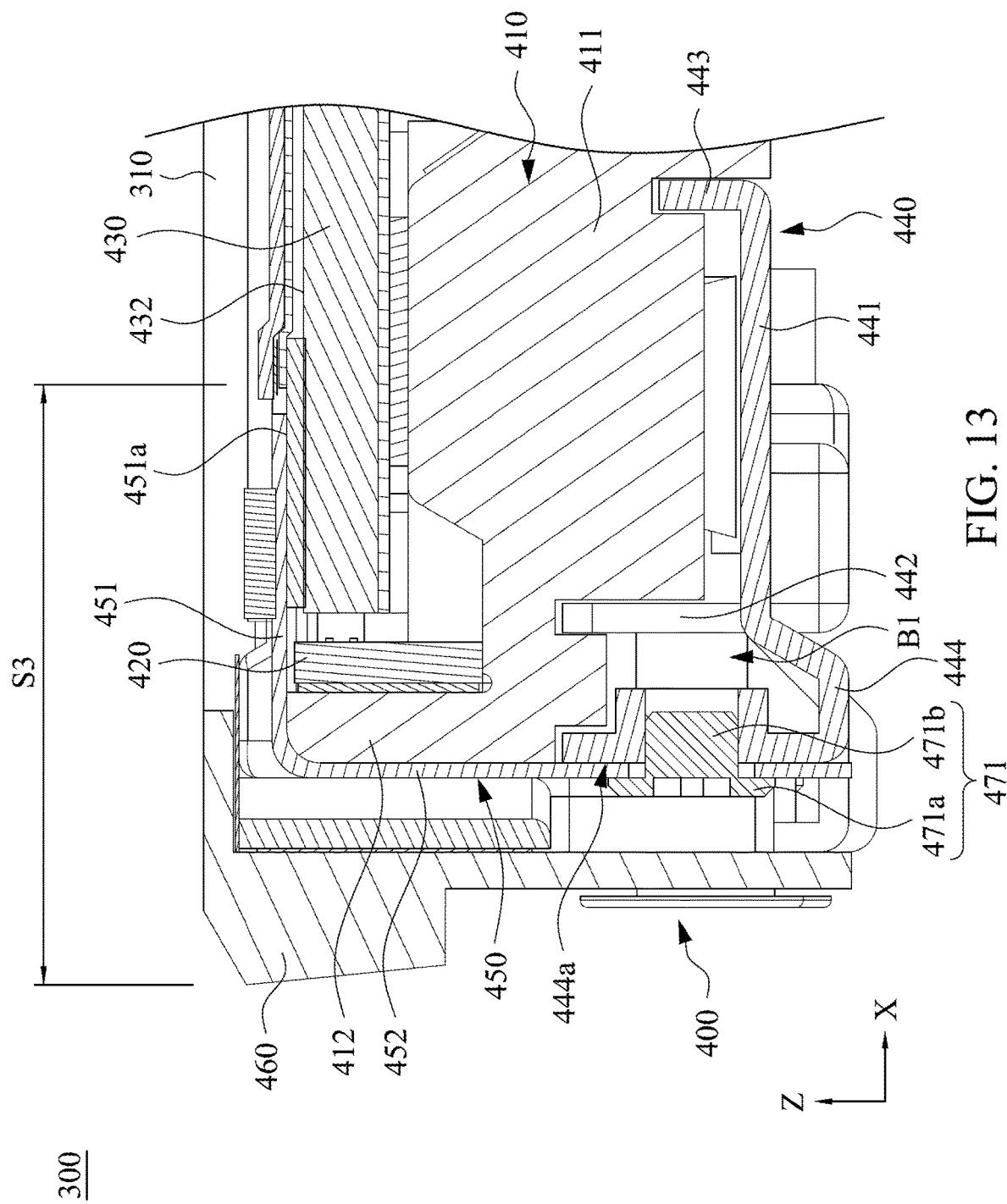
FIG. 13 is a schematic cross-sectional view taken along a line F-F in FIG. 9.

Referring to FIG. 11 and FIG. 13, FIG. 13 is a schematic cross-sectional view taken along a line F-F in FIG. 9. It is noted that, the actual cutting position of the F-F section line in FIG. 9 is substantially the same as the cutting position of the F-F section line in FIG. 12. In the present embodiment, the pressing unit 450 is combined with the fixing frame 440 in the second direction (for example, X-direction as shown in FIG. 11 and FIG. 13). As shown in FIG. 11 and FIG. 13, the pressing unit 450 is an L-shaped structure and has a pressing portion 451 and a side plate portion 452 which is connected to the pressing portion 451. The pressing portion 451 has a pressing surface 451a which abuts against a top surface of the sidewall 412 of the carrying member 410 as well as an optical surface 432 of the light guide plate 430. The side plate portion 452 abuts against an outer side surface of the sidewall 412. In the present embodiment, the assembling structure 470 includes a first assembling member 471. The first assembling member 471 is used to combine the pressing unit 450 on the first L-shaped structure 444 of the fixing frame 440. More specifically, as shown in FIG. 13, the first assembling member 471 passes through the side plate portion 452 of the pressing unit 450 and is fixed on the first contacting surface 444a of the first L-shaped structure 444. The first assembling member 471 has a head portion 471a and a rod portion 471b, the head portion 471a abuts against an outer surface of the side plate portion 452 of the pressing unit 450, and the rod portion 471b passes through the side plate portion 452 to be fixed on the first L-shaped structure 444 which is located in the accommodating space B1. Through the design of the first assembling member 471, the pressing unit 450 can be positioned by the first assembling member 471 in the X direction, thereby preventing the pressing unit 450 from losing its pressing function on the optical surface 432 of the light guide plate 430 due to the displacement.

Figure 14:
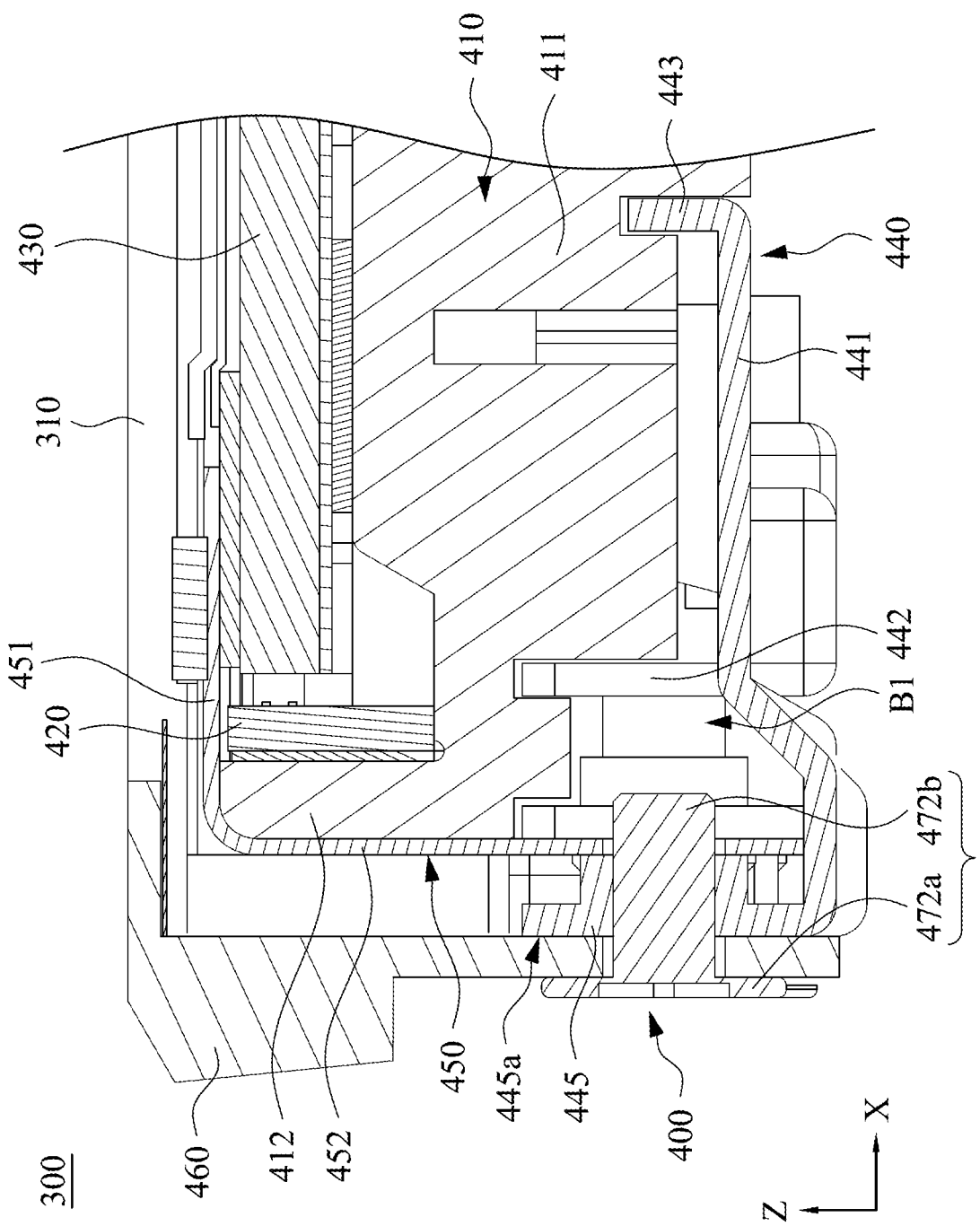
FIG. 14 is a schematic cross-sectional view taken along a line G-G in FIG. 9.

Simultaneously referring to FIG. 11 and FIG. 14, FIG. 14 is a schematic cross-sectional view taken along a line G-G in FIG. 9. It is noted that, the actual cutting position of the G-G section line in FIG. 9 is substantially the same as the cutting position of the G-G section line in FIG. 12. In the present embodiment, the exterior member 460 is combined to the fixing frame 440 along the second direction (for example, X-direction as shown in FIG. 11 and FIG. 14). As shown in FIG. 11 and FIG. 14, the exterior member 460 covers the outside of the pressing unit 450. In the present embodiment, the assembling structure 470 further includes a second assembling member 472. The second assembling member 472 is used to fix the exterior member 460 to the second L-shaped structure 445 of the fixing frame 440. More specifically, as shown in FIG. 14, the second assembling member 472 passes through the exterior member 460 and the side plate portion 452 of the pressing unit 450 to be fixed on the second contacting surface 445a of the second L-shaped structure 445. In one embodiment, the second assembling member 472 has a head portion 472a and a rod portion 472b, the head portion 472a abuts against the outer surface of the exterior member 460, and the rod portion 472b passes through the exterior member 460 and the side plate portion 452 of the pressing unit 450 to be fixed on the second L-shaped structure 445. Through the design of the second assembling member 472, the exterior member 460 and the pressing unit 450 can be positioned by the second assembling member 472 at the same time. When a user looks at the display device 300 in the −Z direction, the head portion 472a of the second assembling member 472 can be covered or sheltered by a protruding portion of the exterior member 460, so as to hide the fixing location of the second assembling member 472.

Figure 15:
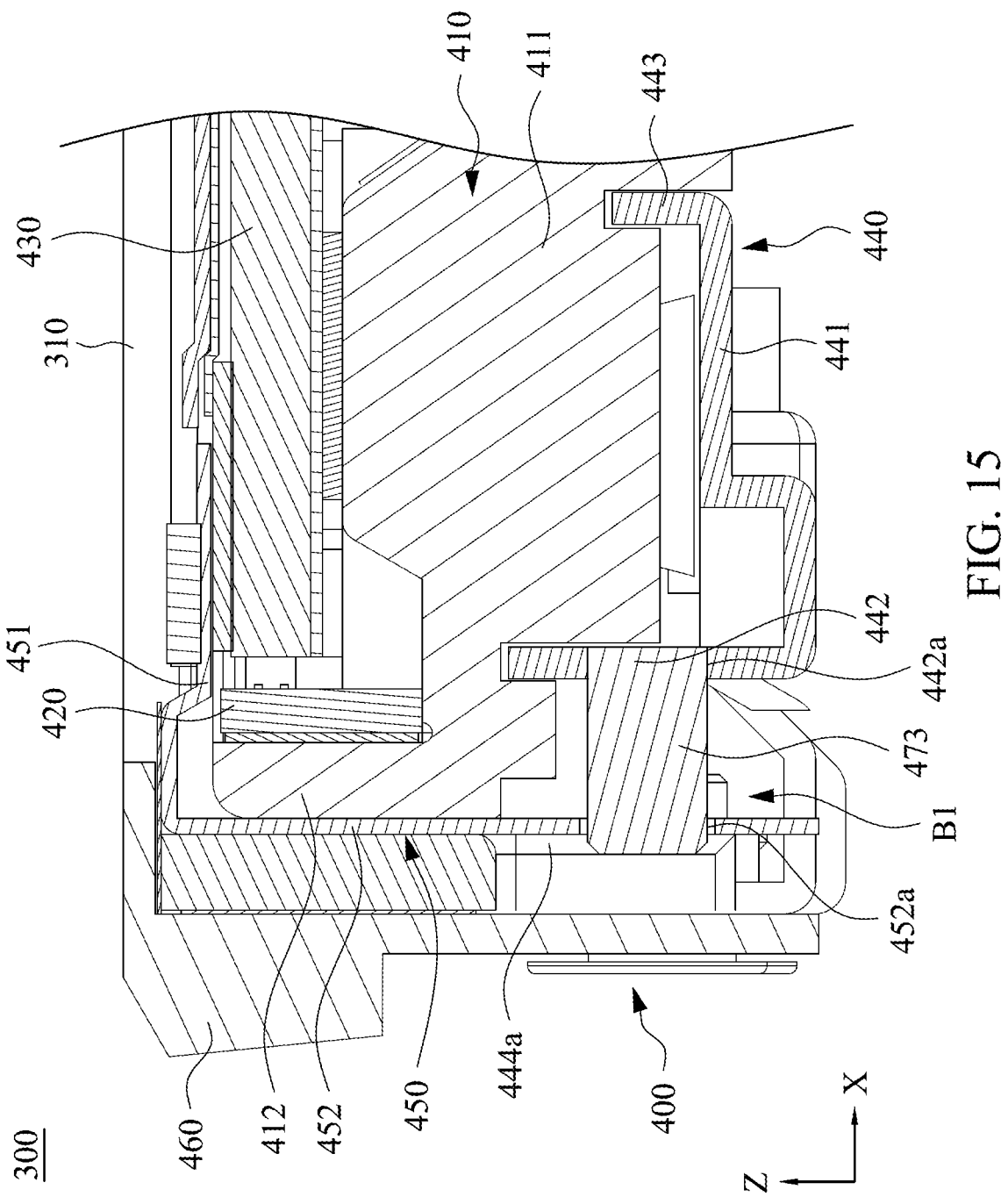
FIG. 15 is a schematic cross-sectional view taken along a line H-D in FIG. 9.

Simultaneously referring to FIG. 11 and FIG. 15, FIG. 15 is a schematic cross-sectional view taken along a line H-H in FIG. 9. It is noted that, the actual cutting position of the H-H section line in FIG. 9 is substantially the same as the cutting position of the H-H section line in FIG. 12. The assembling structure 470 further includes a fixing post 473. The fixing post 473 is disposed in the accommodating space B1. The fixing post 473 can be embedded in the fixing hole 442a of the first engaging wall 442 and extends along a direction parallel to the second direction (for example, −X-direction as shown in FIG. 15) from the first engaging wall 442. In the present embodiment, the side plate portion 452 of the pressing unit 450 has a through hole 452a, when the pressing unit 450 is combined to the fixing frame 440 along the second direction (for example, X-direction), one portion of the fixing post 473 is located in the through hole 452a, thereby positioning the pressing unit 450.

According to the aforementioned embodiments of the present disclosure, the present embodiment cancels the use of the sheet metal 911 as shown in FIG. 1. Instead, the stripe fixing frame 440 is designed to be fixed on one side of the bottom portion of the carrying member 410, thereby meeting an installation requirement of different types of outer components. In addition, the assembling structures 470 with different lengths can be fixed to the first engaging wall 442 so as to fix the outer component on the fixing frame 440 having a strong structural strength. Moreover, the accommodating space B1 is formed by the non-coplanar design of the fixing frame 440 and the carrying member 410 to accommodate the assembling structure 470, thereby reducing the border width of the display panel 300 (for example, a width S3 shown in FIG. 13), so as to meet a requirement of narrow border. On the other hand, by the design of the stripe fixing frame 440, the carrying member 410 can be exposed, thereby improving the heat dissipation effect of the carrying member 410.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
a carrying member comprises a carrying portion;
a light source disposed on the carrying member;
a light guide plate disposed on the carrying member, wherein a light-incident surface of the light guide plate is disposed adjacent to the light source;
a fixing frame fixed on a bottom portion of the carrying member along a first direction, wherein the fixing frame comprises a first engaging wall which is embedded in the carrying portion of the carrying member; and
an outer component fixed on the fixing frame along a second direction.

2. The backlight module of claim 1, wherein
the backlight module further comprises an assembling structure;
the fixing frame is non-coplanar with the carrying member in the second direction to form an accommodating space; and
at least one portion of the assembling structure is located in the accommodating space, and the assembling structure fixes the outer component to the fixing frame in the second direction.

3. The backlight module of claim 1, wherein
the fixing frame further comprises
a plate portion abutted against a bottom surface of the carrying portion; and
wherein the first engaging wall stands on the plate portion, and the first engaging wall is embedded in the bottom surface of the carrying portion.

4. The backlight module of claim 3, wherein the plate portion has at least one mounting hole, and at least one mounting member can be inserted through the mounting hole along the first direction to fix the plate portion to the bottom surface of the carrying portion.

5. The backlight module of claim 2, wherein
the fixing frame further comprises:
a plate portion abutted against a bottom surface of the carrying portion; and
wherein the first engaging wall stands on the plate portion, and the first engaging wall is embedded in the bottom surface of the carrying portion.

6. The backlight module of claim 5, wherein the carrying member further comprises a sidewall standing on a side edge of the carrying portion, the fixing frame further comprises a second engaging wall standing on the plate portion, wherein the second engaging wall is embedded in the bottom surface of the carrying portion, and a distance between the second engaging wall and the sidewall is greater than a distance between the first engaging wall and the sidewall.

7. The backlight module of claim 6, wherein
the accommodating space is defined by the first engaging wall, the carrying portion and the sidewall; and
the assembling structure is disposed on the first engaging wall.

8. The backlight module of claim 6, wherein the assembling structure comprises a fixing post disposed on an outer side surface of the first engaging wall, wherein the fixing post extends along a direction parallel to the second direction to be fixed with the outer component.

9. The backlight module of claim 6, wherein the assembling structure comprises at least one fixing hole and at least one fixing post, wherein the fixing hole penetrates through an outer side surface of the first engaging wall, and the fixing post is fixed in the fixing hole, wherein the fixing post extends from the outer side surface of the first engaging wall along a direction parallel to the second direction to be fixed with the outer component.

10. The backlight module of claim 6, wherein
the outer component comprises a pressing unit, wherein the pressing unit has a pressing portion and a side plate portion, wherein the pressing portion has a pressing surface abutted against a top surface of the sidewall and an optical surface of the light guide plate, and the side plate portion is connected to the pressing portion and is abutted against an outer side surface of the sidewall; and
the assembling structure further comprises a first fixing post and a first fixing member, wherein the first fixing post is disposed on the first engaging wall of the fixing frame, and the first fixing member passes through the side plate portion of the pressing unit and is fixed on the first fixing post.

11. The backlight module of claim 10, wherein the first fixing member of the assembling structure has a head portion and a rod portion, and the first fixing post and the rod portion of the first fixing member are located in the accommodating space, and the rod portion passes through the side plate portion of the pressing unit and is fixed in the first fixing post.

12. The backlight module of claim 10, wherein
the outer component further comprises an exterior member, and the exterior member covers the outside of the pressing unit; and
the assembling structure further comprises a second fixing post and a second fixing member, wherein the second fixing post is disposed on the first engaging wall of the fixing frame, and the second fixing member passes through the exterior member and the side plate portion of the pressing unit and is fixed on the second fixing post.

13. The backlight module of claim 6, wherein
the fixing frame further comprises a first L-shaped structure extending from the plate portion, wherein the first L-shaped structure has a first contacting surface extending along the first direction;
the outer component comprises a pressing unit, and the pressing unit has a pressing portion and a side plate portion, wherein the pressing portion has a pressing surface abutted against a top surface of the sidewall and an optical surface of the light guide plate, and the side plate portion is connected to the pressing portion and is abutted against the outer side surface of the sidewall; and
the assembling structure further comprises a first assembling member passing through the side plate portion of the pressing unit and is fixed on the first contacting surface of the first L-shaped structure.

14. The backlight module of claim 13, wherein the first assembling member of the assembling structure has a head portion and a rod portion, wherein the first contacting surface of the first L-shaped structure and the rod portion of the first assembling member are located in the accommodating space, and the rod portion passes through the side plate portion of the pressing unit and is fixed on the first L-shaped structure.

15. The backlight module of claim 13, wherein
the fixing frame further comprises a second L-shaped structure extending from the plate portion, wherein the second L-shaped structure has a second contacting surface extending along the first direction, and a distance between the second contacting surface and the first engaging wall is greater than a distance between the first contacting surface and the first engaging wall;

the outer component comprises an exterior member covering the pressing unit;

the assembling structure further comprises a second assembling member passing through the exterior member and the side plate portion of the pressing unit, wherein the second assembling member is fixed on the second contacting surface of the second L-shaped structure.

16. A display device, comprising:

a backlight module of claim 1; and a display panel disposed in front of the backlight module.

* * * * *